United States Patent
McClendon

(10) Patent No.: US 10,491,571 B2
(45) Date of Patent: *Nov. 26, 2019

(54) COMPUTING SYSTEM IMPLEMENTING DUAL CONTENT ENCRYPTION FOR A TRANSPORT SERVICE

(71) Applicant: Uber Technologies, Inc., San Francisco, CA (US)

(72) Inventor: Brian McClendon, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,521

(22) Filed: Sep. 12, 2018

(65) Prior Publication Data

US 2019/0028444 A1 Jan. 24, 2019

Related U.S. Application Data

(63) Continuation of application No. 15/202,481, filed on Jul. 5, 2016, now Pat. No. 10,129,221.

(51) Int. Cl.
| | |
|---|---|
| *H04L 9/32* | (2006.01) |
| *H04L 29/06* | (2006.01) |
| *G06Q 50/30* | (2012.01) |
| *H04L 9/08* | (2006.01) |
| *H04W 12/02* | (2009.01) |

(52) U.S. Cl.
CPC ......... *H04L 63/0428* (2013.01); *G06Q 50/30* (2013.01); *H04L 9/0825* (2013.01); *H04L 9/0894* (2013.01); *H04L 63/0442* (2013.01); *H04W 12/02* (2013.01); *H04L 2209/84* (2013.01)

(58) Field of Classification Search
CPC ........ H04L 63/0428; H04L 9/14; G06Q 50/30
USPC ......................................................... 713/168
See application file for complete search history.

(56) References Cited

U.S. PATENT DOCUMENTS

| | | | |
|---|---|---|---|
| 6,195,648 B1 | 2/2001 | Simon | |
| 6,263,435 B1* | 7/2001 | Dondeti | H04L 9/0822 380/259 |
| 8,010,285 B1 | 8/2011 | Denise | |

(Continued)

FOREIGN PATENT DOCUMENTS

| | | |
|---|---|---|
| EP | 1156462 | 11/2005 |
| EP | 2767962 | 8/2014 |

(Continued)

OTHER PUBLICATIONS

IPRP in PCT/US2017/037421 dated Dec. 27, 2018.

(Continued)

*Primary Examiner* — Mohammad W Reza

(74) *Attorney, Agent, or Firm* — Mahamedi IP Law LLP

(57) ABSTRACT

A computing system can initiate one or more recording mechanisms to record content within a passenger interior of the vehicle as a driver transports a rider. After the vehicle arrives at a drop-off location, the computing system can dual encrypt the content utilizing a first public key associated with the driver and a second public key associated with the requesting user and store the dually encrypted content in a storage device. Decryption can require a pair of private keys associated with the rider and the driver.

20 Claims, 6 Drawing Sheets

(56) References Cited

U.S. PATENT DOCUMENTS

| | | |
|---|---|---|
| 8,417,448 B1 | 4/2013 | Denise |
| 8,417,449 B1 | 4/2013 | Denise |
| 8,538,158 B1 | 9/2013 | Denise |
| 8,670,930 B1 | 3/2014 | Denise |
| 8,718,926 B1 | 5/2014 | Denise |
| 8,915,738 B2 | 12/2014 | Mannino |
| 8,924,240 B2 | 12/2014 | Depura et al. |
| 8,934,719 B1 | 1/2015 | Denise |
| 9,097,545 B1 | 8/2015 | Denise |
| 9,898,759 B2 | 2/2018 | Khoury |
| 2008/0252412 A1 | 10/2008 | Larrson |
| 2008/0255722 A1 | 10/2008 | McClellan |
| 2009/0088924 A1 | 4/2009 | Coffee |
| 2009/0192851 A1 | 7/2009 | Bishop |
| 2009/0234552 A1 | 9/2009 | Takeda |
| 2010/0020170 A1 | 1/2010 | Higgins-Luthman |
| 2010/0136994 A1 | 6/2010 | Taylor |
| 2011/0000747 A1 | 1/2011 | Wu |
| 2011/0301806 A1 | 12/2011 | Messier |
| 2011/0301985 A1 | 12/2011 | Camp |
| 2012/0174111 A1 | 7/2012 | Pala |
| 2012/0191343 A1 | 7/2012 | Haleem |
| 2012/0232741 A1 | 9/2012 | Sekiyama |
| 2012/0232943 A1 | 9/2012 | Myr |
| 2012/0283893 A1 | 11/2012 | Lee |
| 2013/0005414 A1 | 1/2013 | Bindra |
| 2013/0066688 A1 | 3/2013 | Pinkus |
| 2013/0226622 A1 | 8/2013 | Adamson |
| 2013/0311081 A1 | 11/2013 | Yamakawa |
| 2013/0345961 A1 | 12/2013 | Leader |
| 2014/0051465 A1 | 2/2014 | Ruys et al. |
| 2014/0067434 A1 | 3/2014 | Bourne et al. |
| 2014/0129951 A1 | 5/2014 | Amin et al. |
| 2014/0207342 A1 | 7/2014 | Chen et al. |
| 2014/0358376 A1 | 12/2014 | Phelan |
| 2015/0095235 A1 | 4/2015 | Dua |
| 2015/0100505 A1 | 4/2015 | Binion |
| 2015/0106900 A1 | 4/2015 | Pinski |
| 2015/0113622 A1 | 4/2015 | Dua |
| 2015/0223024 A1 | 8/2015 | Abuodeh |
| 2015/0266455 A1 | 9/2015 | Wilson |
| 2015/0279213 A1 | 10/2015 | Balter |
| 2015/0302342 A1* | 10/2015 | Yeh ............... G06Q 10/063114 705/7.15 |
| 2015/0307107 A1 | 10/2015 | Tamari |
| 2015/0348221 A1 | 12/2015 | Pedersen |
| 2016/0232719 A1 | 8/2016 | Brinig |
| 2016/0358388 A1 | 12/2016 | Skoglund |
| 2017/0039890 A1 | 2/2017 | Truong |
| 2017/0132540 A1* | 5/2017 | Haparnas ......... G06Q 10/06311 |
| 2017/0358146 A1 | 12/2017 | Brinig |
| 2017/0358147 A1 | 12/2017 | Brinig |
| 2017/0371608 A1* | 12/2017 | Wasserman ............... G06F 3/14 |
| 2017/0372534 A1 | 12/2017 | Steketee |
| 2018/0086347 A1 | 3/2018 | Shaikh |
| 2018/0089605 A1 | 3/2018 | Poornachandran |
| 2018/0238705 A1 | 8/2018 | O'Herlihy |
| 2019/0139450 A1 | 5/2019 | Truong |

FOREIGN PATENT DOCUMENTS

| | | |
|---|---|---|
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search Report and Written Opinion in PCT/US2016/026799 dated Jul. 28, 2016.
International Search report in PCT/US2016/016858 dated May 19, 2016.
IPRP in PCT/2016/016858 dated Aug. 17, 2017.
International Search Report and Written Opinion in PCT/US2017/037421 dated Aug. 31, 2017.
IPRP in PCT/US2016/026799 dated Oct. 17, 2017.
Written Opinion issued in SG 11201708199T dated May 7, 2018.

* cited by examiner

COMPUTING SYSTEM IMPLEMENTING DUAL CONTENT ENCRYPTION FOR A TRANSPORT SERVICE

CROSS-REFERENCE TO RELATED APPLICATION

This application is a Continuation of U.S. patent application Ser. No. 15/202,481, titled "Transport Facilitation System Implementing Dual Content Encryption," and filed on Jul. 5, 2016, which is hereby incorporated by reference in its entirety.

BACKGROUND

Jurisdictions throughout the world are seeking to keep up with privacy concerns of their citizens as information technology grows ever more complex and ubiquitous. For example, the European Union's General Data Protection Regulation (GDPR) (applicable from May 2018) sets forth mandates that require valid and explicit consent for data collected, a purpose for the collection of such data, a right to erasure of data, and a right to the portability of personal data between electronic processing systems. New mandates by governments present increased challenges for businesses and service providers to not only comply with such protections, but also to identify and anticipate the effects of such protections, and ensure customer satisfaction regarding data use and privacy—sometimes providing guarantees that a service provider handling data is absolutely incapable of viewing data without secure identification and consent from the user.

In the United States, no current comprehensive legislation exists that seeks to regulate the acquisition, storage, and use of personal data. However, compliance with international safe harbor privacy principals have traditionally provided a means for U.S. companies to integrate privacy restrictions with European companies, and new directives considered under the EU-US Privacy Shield seek to establish regulatory consistency—such as agreements relating to data deletion, mass data gathering, and Ombudsman mechanisms. Additionally, Asian nations have adopted or are quickly adopting comprehensive "European-style" personal data protections. Thus, such general trends of worldwide regulations are geared towards not only alleviating privacy concerns of citizens, but also protecting businesses and citizens alike from reprehensible black hat hacking attacks.

Imperative to establishing personal data privacy guarantees is the trusted encryption of data being transmitted over unsecured networks. Public key and private key cipher algorithms offer solutions to data encryption when privacy is a fundamental concern. In such cryptographic systems, public keys may be disseminated widely while private keys are attributed only to the owner. Encryption schemes can typically involve a large random number (e.g., the product of two large primes or discrete logarithms) that is sequenced through a key generation algorithm to generate an asymmetric public key/private key pair—where the private key is not deducible from the public key. Typically, the public key—which can be widely disseminated—is utilized to encrypt data, whereas the private key—in secured storage—is utilized to decrypt the encrypted data. Thus, once data is encrypted using any respective public key, it cannot be decrypted without the paired private key. In order to provide increased guarantees to consumers, companies can provide security assurances based on general best practice recommendations where security protections and control processes can be validated by multiple independent third-party entities.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
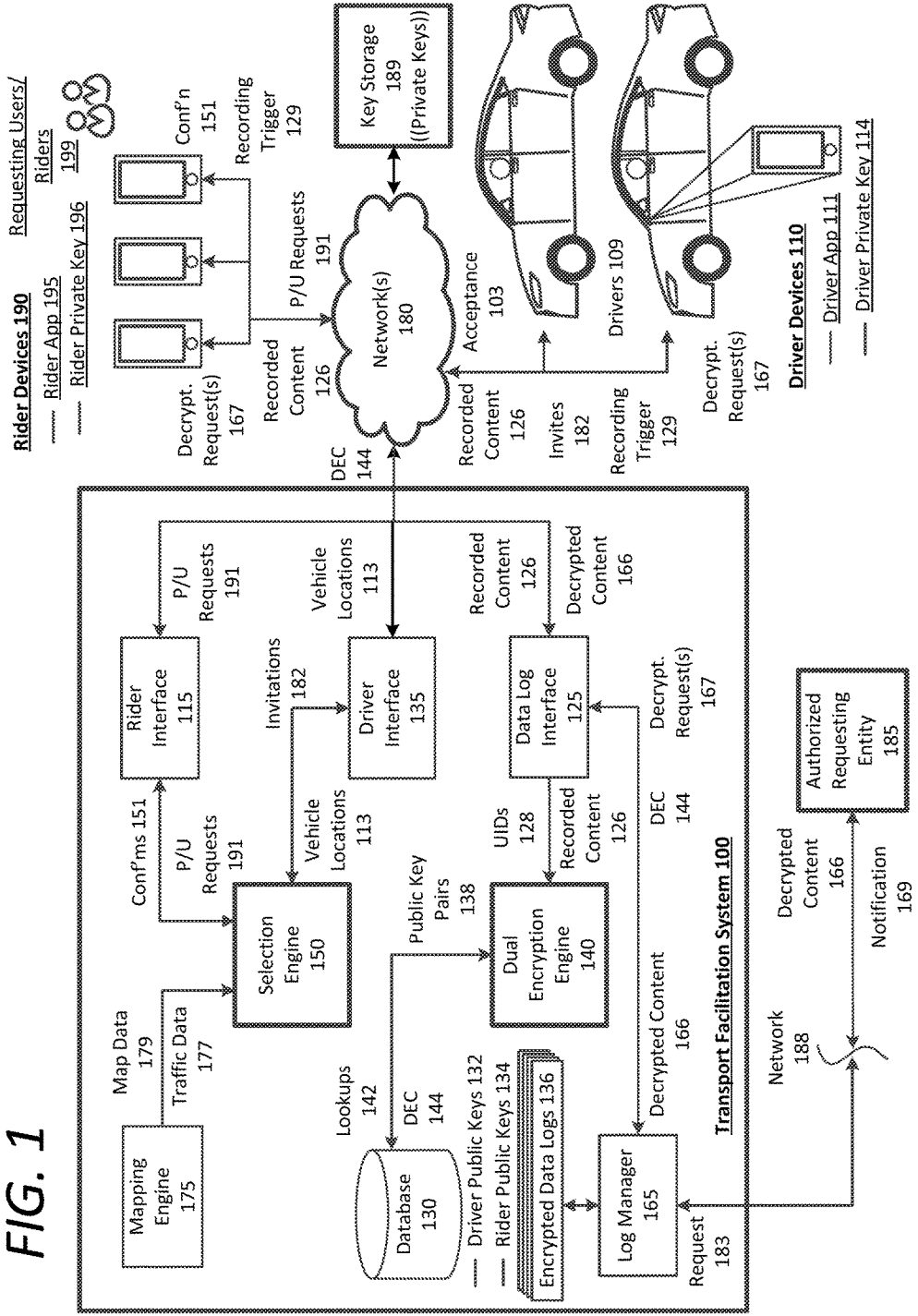
FIG. 1 is a block diagram illustrating an example transport facilitation system in communication with user and driver devices, in accordance with examples described herein.

A system is provided that utilizes public key pairs to encrypt recorded content corresponding to a physical meeting, encounter, or appointment between people utilizing a service (e.g., via a service application executable on the individuals' computing devices). The service can correspond to any particular service in which users interact with or meet other users, such as with sales transaction applications, social media meetup applications (e.g., community apps or dating apps), and/or ride sharing service applications described in detail herein. Utilizing the public keys of both parties to a meetup, encounter, sales, transaction, date, etc., can ensure that decryption of the recorded content can only take place utilizing the private keys of both parties (e.g., upon party consent).

For examples in the context of ride sharing service applications, a transport facilitation system is disclosed herein that can manage a transportation arrangement service linking requesting users with available drivers throughout a given region (and/or linking a requesting user with another requesting user that are sharing a ride together). For example, the transport facilitation system can receive pick-up requests from requesting users via a rider application executing on the users' mobile computing devices. Utilizing a current location or an inputted pick-up location, the transport facilitation system can identify proximate available drivers utilizing the location based resources on the drivers' mobile devices (e.g., via a designated driver application executing thereon). The transport facilitation system can transmit an invitation to service the pick-up request to an optimal proximate driver via the executing driver application, and receive a confirmation that the driver is en route or otherwise traveling to rendezvous with the requesting user to transport the user from the pick-up location to a destination location inputted by the requesting user.

According to examples described herein, the transport facilitation system can monitor the driver's dynamic location and, when the driver is within a predetermined distance or time from the pick-up location, the transport facilitation system can initiate one or more recording mechanisms to record content within a passenger interior of the driver's vehicle. It is contemplated that the content recording is not to be utilized unless extenuating circumstances materialize over the course of the ride from the pick-up location to the destination location, such as behavioral malfeasance on the part of the driver or rider, or exigent circumstances such as a car accident. Furthermore, it is contemplated that knowledge of the content recording during trips can serve as a preventative measure against any potential anomalous situations (e.g., tortious conduct), and further equalize gender disparity prevalent in the ride services industry. In order to ensure personal data privacy while also implementing such preventative measures, examples described herein utilize a recording device (e.g., an on board video and/or audio recorder such as a camera and/or microphone of the driver's and/or rider's mobile computing device) to record content over the course of a given trip. At a specified location and/or time, such as when the trip is completed, examples described herein provide for dual encryption of the recorded content using a pair of public keys associated with the driver and the rider respectively, and store/log the dually encrypted content in data logs either locally or in the cloud.

According to examples described herein, when the vehicle arrives at a particular location (e.g., the destination location of the ride), the transport facilitation system can transmit one or more termination triggers to terminate the recording mechanism(s). In some aspects, the recording mechanism can comprise the driver device (e.g., the driver's mobile computing device executing the designated driver application), the rider device (e.g., the rider's mobile computing device executing the designated rider application), both driver and rider devices for redundancy purposes, or a dedicated recording device within the passenger interior of the driver's vehicle. Furthermore, as provided herein, the recorded content can comprise audio data, video data, or both audio and video data. The transport facilitation system may then dual encrypt the recorded content utilizing a first public key associated with the driver and a second public key associated with the requesting user. The public keys can be stored in a database at the transport facilitation system or can be downloaded from the driver and rider devices via the designated service applications. Thereafter, the transport facilitation system can store the dually encrypted content indeterminately or for a predetermined amount of time (e.g., two years). As provided herein, the stored content can require dual decryption, necessitating both the driver's private key and the rider's private key—neither of which are readily accessible by the transport facilitation system.

Accordingly, for every single trip managed or facilitated by the transport facilitation system, at least one dually encrypted recording can be logged. In some aspects, the transport facilitation system can associate each logged recording with unique identifiers (UIDs) associated with both the rider and driver, and a timestamp so that the recording can be promptly recovered in case the recording is needed for dual decryption. Furthermore, the public/private key pairs issued to the rider and driver can be dedicated keys associated with the transportation arrangement service. The public keys may be disseminated publicly and thus stored locally by the transport facilitation system. However, the private key can be stored in secure storage, either in a hidden or password-protected folder in the rider and driver devices, or in secure storage in the cloud (e.g., using a third-party cloud encryption key storage service). For example, the private keys of riders and drivers may be stored in the cloud and can themselves be encrypted using respective passwords for the riders' and drivers'. In such examples, if the mobile device of a particular rider or driver is lost or destroyed, the private key may still be recovered.

Furthermore, it is contemplated that riders and/or drivers may wish to have the option of opting into such content recording. Thus, in certain implementations, the rider and/or driver application can provide an opt-in feature to enable the either the requesting rider or the driver to trigger the recording mechanism. Such a feature may be presented on a user interface generated by the designated application of the device, and can be initiated via a touch selection in order to provide ease of use and on-demand activation of the content recording.

Still further, embodiments described herein are not limited to dual encryption/decryption of recorded content. Rather, in ride pool scenarios with more than two riders, the transport facilitation system may encrypt recorded content utilizing more than two public keys (e.g., utilizing the public keys of all riders). Thus, in certain examples in which a ride pool driver drives throughout a given region, picking up multiple passengers at a time, recorded content may be encrypted and stored on a passenger by passenger basis. That is, the transport facilitation system may utilize a respective passenger's public key for only content recorded corresponding to a ride segment for the passenger. In follows that a particular recording segment for a ride may be encrypted and stored multiple times using different public keys, and a log manager of the transport facilitation system may organize such recordings separately utilizing UIDs and timestamps based on the individual riders and ride segments.

Among other benefits, the examples described herein achieve a technical effect of providing personal data privacy while encouraging safety in the ride services industry. Content recording within vehicles during rides can act as a deterrent to unprofessional, improper, unruly, dangerous, or predatory behavior, thereby protecting both riders and drivers, while dual content encryption utilizing public key pairs can provide privacy guarantees for both rider and driver parties. Furthermore, in the unfortunate scenario in which a tortious or criminal act does occur over the course of a particular trip, an evidentiary resource is provided that may be dually decrypted utilizing the private key pairs of the driver and rider.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

FIG. 1 is a block diagram illustrating an example transport facilitation system in communication with user and driver devices, in accordance with examples described herein. In accordance with examples provided herein, the transport facilitation system 100 can manage a transportation arrangement service that connects requesting users 199 with drivers 109 that are available to service the users' 199 pick-up requests 191. The transportation arrangement service can provide a platform that enables ride sharing services between requesting users 199 and available drivers 109 by way of a rider application 195 executing on the rider devices 190, and a driver application 111 executing on the driver devices 110. As used herein, a rider device 190 and a driver device 110 can comprise a computing device with functionality to execute a designated application corresponding to the transportation arrangement service managed by the transport facilitation system 100. In many examples, the rider device 190 and the driver device 110 can comprise mobile computing devices, such as smartphones, tablet computers, VR or AR headsets, on-board computing systems of vehicles, and the like. Example transportation arrangement services implementing a ride sharing platform include those provided by UBER Technologies, Inc. of San Francisco, Calif.

The transport facilitation system 100 can include a rider interface 115 to communicate with rider devices 190 over one or more networks 180 via a rider application 195. According to examples, a requesting user 199 wishing to utilize the transportation arrangement service can launch the rider application 195 and transmit a pick-up request 191 over the network 180 to the transport facilitation system 100. In some examples, the pick-up request 191 can include a pick-up location within a given region (e.g., a metroplex managed by one or more datacenters corresponding to the transport facilitation system 100) in which a matched driver is to rendezvous with the requesting user 199. The pick-up location can be inputted by the user by setting a location pin on a user interface of the rider app 195, or can be determined by a current location of the requesting user 199 (e.g., utilizing location-based resources of the rider device 190). Additionally, the requesting user 199 can further input a destination during or after submitting the pick-up request 191.

In various implementations, the transport facilitation system 100 can further include a selection engine 150 to process the pick-up requests 191 to ultimately select drivers 109 to service the pick-up requests 191. The transport facilitation system 100 can include a driver interface 135 to communicate with the driver devices 110 via the driver application 111. In accordance with various examples, the driver devices 110 can transmit their current locations using location based resources of the driver devices 110 (e.g., GPS resources). These vehicle locations 113 can be utilized by the selection engine 150 to identify a set of proximate drivers 109 to the pick-up location that can service the pick-up request 191.

In some aspects, the transport facilitation system 100 can include a mapping engine 175, or can utilize a third-party mapping service, to receive map data 176 and or traffic data 177 in the environment surrounding the pick-up location. In certain examples, the selection engine 150 can utilize the map data 179 and traffic data 177 to estimate a time of arrival for each of the proximate drivers in order to make an optimal selection. Thus, the selection engine 150 can converge on an optimal driver 109 to service the pick-up request 191 based on the pick-up location, the vehicle locations 113 of proximate available drivers in relation to the pick-up location, map data 179 and or traffic data 177, and/or estimated time of arrival (ETA) information determined from the map data 179 and traffic data 177. Accordingly, the optimal driver 109 can be selected based on being the shortest distance and/or time from the pick-up location.

In certain implementations, the transport facilitation system 100 can select a proximate self-driving vehicle (SDV) to service the pick-up request 191, as described below. SDV implementations can involve a similar dual encryption process implemented by the transport facilitation system 100, as described herein. Thus, for SDV implementations, the transport facilitation system 100 can utilize a public key associated with the SDV to encrypt recorded content, and the private key of the SDV can be maintained elsewhere (e.g., securely in memory of the SDV, or at a secure third party location).

According to examples described herein, once a driver 109 is selected to service the pick-up request 191, the selection engine 150 can generate an invitation 182 to rendezvous with the requesting user 199 at the pick-up location and transport the requesting user 199 to the destination. The driver interface 135 can transmit the invitation 182 to the selected driver 109 over the network 180 and via the driver app 111. According to examples described herein, the driver 109 can either accept or decline the invitation 182. If the invitation 182 is declined, then the selection engine 150 can select a next best driver utilizing the vehicle locations 113, map data 179, traffic data 177, ETA information, etc., and transmit an invitation 182 to that driver. If that driver declines, then the selection engine 150 can continue to repeat the selection process until a driver accepts the invitation 182.

In accepting the invitation 182, the driver 109 can input an acceptance 103 into the driver app 111, which can be transmitted to the driver interface 135 over the network 180. The selection engine 150 can process the acceptance 103 by generating a confirmation 151 indicating certain vehicle information (e.g., vehicle identifiers such as type, color, and license plate information, the driver's name, a driver photo, and the like). The selection engine 150 may then transmit the confirmation 151 to the requesting user's 199 rider device 190, which can be viewable by the requesting user 199 on the rider app 195. Furthermore, the selection engine 150 can generate the confirmation 151 to include the ETA information of the selected driver 109 as the driver is en route (e.g., traveling) to rendezvous with the requesting user at the pick-up location.

According to various examples described, the transport facilitation system 100 can further include a data log interface 125 to transmit recording triggers 129 to one or more of the driver device 110 or the rider device 190. The recording triggers 129 can cause a recording device within the selected vehicle to begin recording at a certain time prior to the driver 109 arriving at the pick-up location, or when the requesting rider 199 enters the vehicle. The timing of the recording trigger 129 can be based on the ETA information. For example, the data log interface 125 can transmit the recording trigger(s) 129 once the ETA information indicates thirty seconds to pick-up. In variations, the recording trigger 129 can be caused by the driver selecting a pick-up indicator on the driver device 110, which indicates to the transport facilitation system 100 that the pick-up has been made and the ride has commenced (which can initiate a payment clock for the driver 109).

In some aspects, the data log interface 125 can transmit the recording trigger 129 only to the driver device 110. In other aspects, the data log interface 125 can transmit the recording trigger 129 to only the rider device 190. In still further aspects, the data log interface 125 can transmit the recording trigger 129 to both the rider device 190 and the driver device 110. As described, the data log interface 125 can time the recording triggers 129 such that the entire ride is recorded from within the passenger interior of the driver's vehicle. Furthermore, the recording triggers 129 can be transmitted via the rider app 195 and/or driver app 111 to the respective rider device 190 and/or driver device 110. The recording trigger 129 can cause recording resources on the rider device 190 and/or driver device 110 to initiate, such as a microphone recorder for audio content and/or a camera recorder for video content.

In one aspect, the recording trigger 129 is transmitted to the driver device 110 prior to rendezvousing with the requesting user 199 at the pick-up location (e.g., just before the driver arrives at the pick-up location based on an ETA, such as ten seconds before, or at a time before the driver indicates that the rider has been picked up or that the ride has started). Alternatively, in another example, the data log interface 125 can transmit the recording trigger 129 in response to another event (e.g., in response to detecting that the ride has started or in response to detecting that the driver location and the rider location are within a predetermined distance from each other). In addition to providing route content to guide the driver 109 from the pick-up location to the destination, the recording trigger 129 can cause the camera (e.g., forward facing camera) of the driver device 110 to begin recording video within the vehicle, and/or a microphone to be initiated on the driver device 110 to record audio content. In certain examples, the transport facilitation system 100 can monitor the route progress of the driver 109 in transporting the user, and based on another event, can transmit a termination trigger to the driver device 110. As some examples, the transport facilitation system 100 can transmit a termination trigger to terminate content recording on the driver device 110 in response to determining that the driver has arrived at the destination location, in response to determining that the user has exited the vehicle (e.g., based on the location of the driver's device and the user's device), or in response to a predetermined duration of time elapsing after determining that the ride has completed (e.g., ten seconds after). Thereafter, when the next pick-up request 191 is accepted by the driver the recording process may repeat. Furthermore, as provided herein the recording process may be performed with the rider device 190 in conjunction with or instead of the driver device 110.

Upon termination of recording, or during the recording itself, the data log interface 125 can receive the recorded content 126, either as a dedicated file or as a live content stream from the driver device 110 and/or rider device 190. The recorded content 126 can be transmitted to a dual encryption engine 140 which can utilize a public key pair 138 comprising the driver's public key and the requesting user's public key to dually encrypt the recorded content 126. According to examples, the transport facilitation system 100 can include a database 130 storing driver public keys 132 and rider public keys 134 for every user and driver throughout the given region. In variations, the public keys 132, 134 may be stored at a third party resource, such as a cloud key management system, and can be accessible by the dual encryption engine 140 over a network. The public keys 132, 134 can further be generated as public/private key pairings for each rider and driver, where the public keys 132, 134 can be disseminated anywhere while the private keys 196, 114 may be securely stored (e.g., on the respective rider or driver device 190, 110).

In certain implementations, the transport facilitation system 100 can utilize a secure key storage 189 in the cloud to store private keys of riders and drivers (e.g., the driver private key 114 and the rider private key 196). For such implementations, each private key in the key storage 189 can be encrypted (e.g., password encrypted by the rider or driver to which the private key pertains). Holding the private keys in a secure storage 189 external to the rider devices 190 and driver devices 110 may be advantageous in scenarios in which an uncooperative rider 199 or driver 109 seeks to prevent access to the recorded content 126 of a particular trip by wiping, disabling, or otherwise destroying the device on which a private key is held. However, in building such a system, certain precautions can be employed to protect the private keys from unauthorized decryption by the transport facilitation system 100 (or the service provider of the transportation arrangement service). For example, the secure key storage 189 can comprise a sandbox and/or virtual machine implemented in the cloud to prevent exposure of the private keys external to the secure key storage 189, and accessibility may be tightly controlled by way of some authorized entity unassociated with the transportation arrangement service provider.

As provided herein, the recorded content 126 can be encrypted using the public key pairs 138 comprising the rider's public key and the driver's public key. The dually encrypted content 144, corresponding to the encrypted recorded content 126, may then be stored in encrypted data logs 136 either locally in the database 130 or on a third party storage resource. In various implementations, the dual encryption engine 140 can further receive unique identifiers (UIDs) 128 corresponding to the rider device 190 (e.g., an account identifier corresponding to a user account of the rider app 195), and the driver device 110, and can associate the logged dual encrypted content 144 with the UIDs 128 and time stamps indicating a date and a time of the recording.

Thus, the dual encryption engine 140 can utilize public key pairs 138 for every rider/driver combination for every trip performed throughout the given region. Furthermore, because the recorded content 126 is encrypted using both the rider's and the driver's public keys, even if the transport facilitation system 100 were to somehow acquire the private key 114, 196 of either the rider 199 or the driver 109, the transport facilitation system 100 still cannot fully decrypt the recorded content 126 without the other private key. Still further, in the unlikely event of a black hat hack into the database 130, the encrypted data logs 136 only contain dually encrypted content 144, and thus any unauthorized hack will not yield any actual recorded content 126.

In certain scenarios, the actual recorded content 126 of a particular ride may be required by an authorized requesting entity 185, such as a legal authority or an administrator attempting to comply with a court-ordered subpoena for evidence. The authorized requesting entity 185 can transmit a request 183 over a network 188 to a log manager 165 of the transport facilitation system 100. In some aspects, the log manager 165 can process the request 183 to determine whether the request 183 is legitimate, or can require a certification process of the authorized requesting entity 185. According to some examples, only upon certification of the authorized entity 185 may the log manager 165 initialize the dual decryption process.

In order to return decrypted content 166 to the authorized requesting entity 185, both the driver 109 and the rider 199 must agree to decrypt the dually encrypted content 144. In certain aspects, the log manager 165 can retrieve the dually encrypted content 144 corresponding to a specified trip associated with the request 183 (e.g., a trip in which a tortious or criminal act occurred between the driver 109 and rider 199 or a third party). For example, the request 183 can contain identifiers of the parties involved (e.g., the driver 109 and/or the rider 199) and a time in which an incident occurred. The log manager 165 can utilize such information to identify a specified dual encrypted recording 144 of a trip associated with the incident, and submit the dual encrypted content 144 to the data log interface 125.

In some examples, the data log interface 125 can transmit a decryption request 167 with the dual encrypted content 144 to the rider device 190 and the driver device sequentially. Although, it is contemplated that either the rider 199 or the driver 109 may have already instigated the first stage of decryption using the respective private key—in which case the decryption request 167 along with the encrypted content (with first stage decryption performed already) may be transmitted to the relevant party for second stage decryption. In accordance with examples, the dual encryption content 144 may be decrypted in the reverse sequence as the content was dually encrypted. For example, if the dual encryption engine 140 first encrypted the content using the public key of the rider 199 and then the public key of the driver 109, then the data log interface 125 will transmit the dual encrypted content 144 first to the driver device 110 for the first stage of decryption using the driver private key 114. Once the first stage of decryption is complete and the now "mono-encrypted" content is received from the driver device 110, the data log interface 125 can transmit the encrypted content to the rider device 190 for second stage decryption using the rider private key 196 to fully decrypt the content. The fully decrypted content 166 may then be transferred back to the data log interface 125—where the decrypted content 166 can comprise the originally recorded content 126 prior to dual encryption.

In certain scenarios, one or more of the driver private key 114 or the rider private key 196 may have been destroyed prior to transmitting the decryption request 167 (e.g., the driver 109 may have lost or destroyed the driver device 110). Thus, in certain variations, the private keys 114, 196 of the rider 199 and the driver 109 may be stored at a trusted cloud storage resource, and may be accessed only after appropriate permissions are granted by the rider 199 and the driver 109 (e.g., through gateways via the rider device 190 and the driver device 110). After the dual decryption process, the decrypted content 166 can be submitted to the log manager 165 and then transferred to the authorized requesting entity 185 over the network 188.

Furthermore, one or more of the driver 109 or the rider 199 may refuse to comply with the decryption request 167. In such scenarios, the log manager 165 can submit a notification 169 to the authorized requesting entity 185 indicating the refusal. The requesting entity 185 may then either capitulate and respect the refusal, or compel compliance with the request 167. Still further, it is contemplated that implementations described in connection with FIG. 1 need not be limited to transportation services. Rather, recordation on user devices may be triggered in virtually any situation in which a pair of user devices enters into a complementary or transactional arrangement. Example situations can include applications utilized for sales transactions (e.g., a vehicle sale) where a buyer and seller must meet in person, business dealings, social meetups (e.g., via a social media application), dating applications, and the like. Thus, examples provided herein may be implemented for such scenarios in which recordation of content is trigger prior to or at the time of meetup of the two parties (e.g., utilizing GPS resources of both devices), and dual encryption using the public keys of both parties may be triggered upon conclusion of the meetup and when it is confirmed that the parties have sufficiently separated.

Methodology

Figure 2:
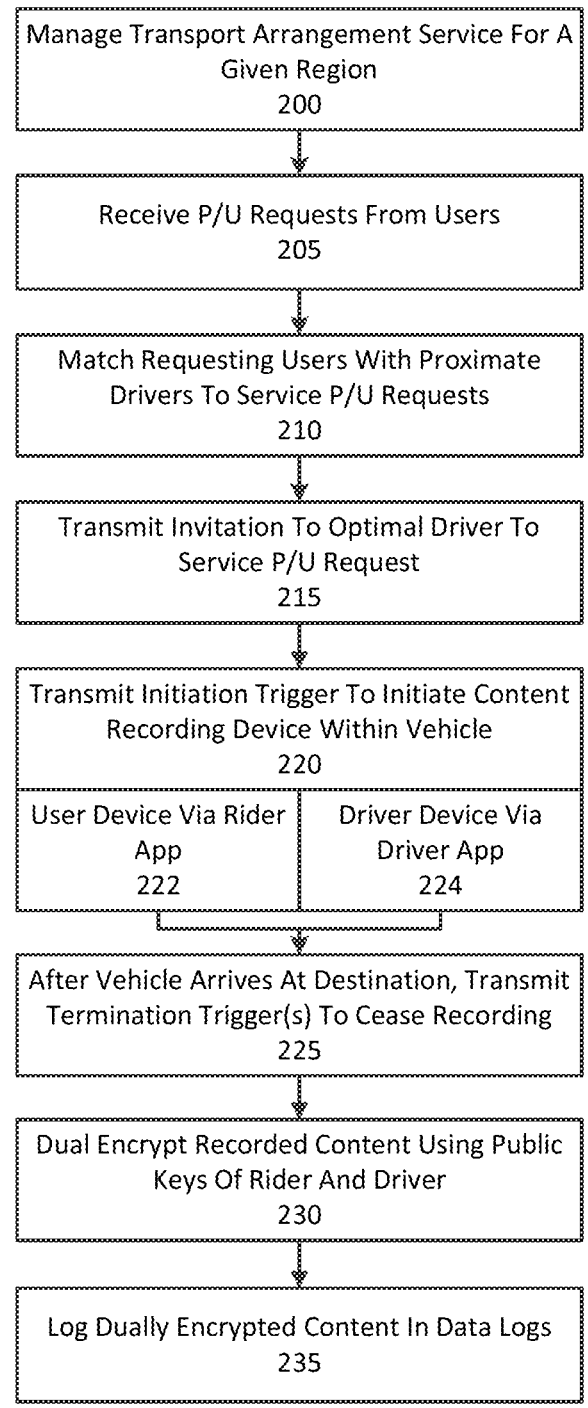
FIG. 2 is a flow chart describing an example method of managing content recordation and dual encryption in connection with a transportation arrangement service.

FIG. 2 is a flow chart describing an example method of managing content recordation and dual encryption in connection with a transportation arrangement service. In the below description of FIG. 2, reference may be made to reference characters representing like features shown and described with respect to FIG. 1. Furthermore, the method described in connection with FIG. 2, may be performed by an example transport facilitation system 100 as shown and described with respect to FIG. 1. Referring to FIG. 2, the transport facilitation system can manage a transportation arrangement service for a given region that connects riders with available drivers (200) (e.g., providing a ride sharing platform). In managing the transportation arrangement service, the transport facilitation system 100 can receive pick-up requests 191 from requesting users 199 (205), and match those requesting users 199 with proximate drivers 109 to service the pick-up requests 191 (210). In doing so, the transport facilitation system 100 can transmit an invitation 182 to an optimal driver to service the pick-up request 191 (e.g., based on ETA information or distance) (215). According to examples provided herein, the optimal driver can either accept or decline the invitation. If declined, the transport facilitation system 100 can transmit the invitation 182 to a next best driver within proximity of the pick-up request 191, and continue to do so until a driver accepts the invitation 182.

The transport facilitation system 100 can then transmit an initiation trigger to initiate a content recording device within the driver's vehicle (220). In many examples, the content recording device can be triggered a predetermined amount of time (e.g., thirty seconds) prior to the driver arriving at the pick-up location (e.g., determined from GPS resources and an ETA of the driver). Furthermore, the initiation trigger can be transmitted to initiate a recording device on the requesting user's device 190 via the rider application 195 (222), the driver device 110 via the driver application 111 (224), or both devices 190, 110. In variations, the initiation trigger can be transmitted to a dedicated recording device (e.g., a video recorder) within the driver's vehicle. As provided herein, the initiation trigger can initialize recording resources on the device, such as a video camera and microphone. Thus, both requesting user 199 and driver 109 can be aware that the trip between the pick-up location and destination is being recorded, but can also be notified that such recordings are only available under exigent circumstances. Furthermore, the device(s) can continue recording audio and/or video content over the course of the whole ride from the pick-up location to the destination.

According to examples described herein, the transport facilitation system 100 can transmit a termination trigger to the recording device(s) after the driver 109 drops off the rider 199 at the destination—where the termination trigger causes the recording device(s) to cease content recording within the vehicle (225). As described herein, the termination trigger can be transmitted to the rider device 190, the driver device 110, or a dedicated recorder, and can cause the recording resources to terminate content recording. In some examples, the transport facilitation system 100 can receive the recorded content 126 as a stream over the course of the trip. In variations, the transport facilitation system 100 can receive the recorded content 126 from the recording device(s) once the trip has completed. The transport facilitation system 100 can dual encryption the recorded audio and/or video content 126 using the public encryption keys of both the rider 199 and the driver 109 (230). When the recorded content 126 is dual encrypted, the transport facilitation system 100 can then log the dually encrypted content 144 in data logs 136 locally or externally (235).

Figure 3:
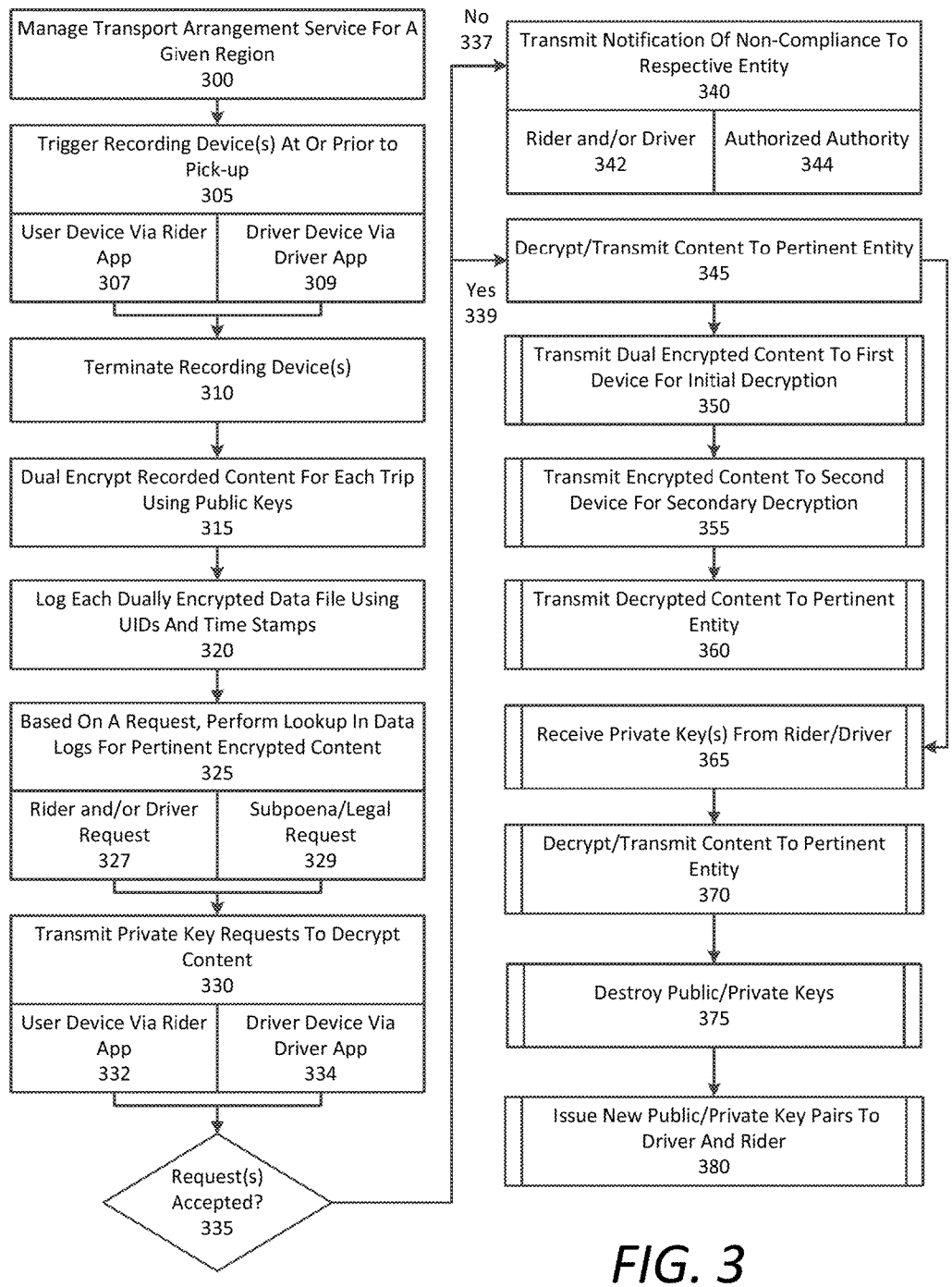
FIG. 3 is a flow chart describing another example method of managing content recordation and dual encryption in connection with a transportation arrangement service.

FIG. 3 is a flow chart describing another example method of managing content recordation and dual encryption in connection with a transportation arrangement service. In the below description of FIG. 3, reference may be made to reference characters representing like features as shown and described with respect to FIG. 1. Furthermore, the below processes described with respect to FIG. 3 may be performed by an example transport facilitation system 100 as shown and described with respect to FIG. 1. Referring to FIG. 3, the transport facilitation system 100 can manage a transport arrangement service for a given region (300), and can one or more trigger recording device(s) to begin recording content within the pick-up vehicle at or prior to each pick-up (305), as described above with respect to FIGS. 1 and 2. In certain implementations, the transport facilitation system 100 can transmit a recording trigger 129, or initiation trigger, to cause the rider device 190 to begin recording content via the rider app 195 (307), the driver device 110 to begin recording content via the driver app 111 (309), or both.

The transport facilitation system 100 can terminate the recording device(s) at the conclusion of each ride (310), and dual encrypt the recorded content 126 for each trip using a public key pair 138 comprising the public key of the rider and the public key of the driver (315), as described herein. The transport facilitation system 100 may then log the dually encrypted content 144 as a data file using timestamps indicating the time and date of the trip, and UIDs identifying the rider 199 and the driver 109 for the trip (320). As described herein, the dual encrypted data file 144 can be stored indefinitely or for a predetermined amount of time before being automatically flushed from the encrypted data logs 136. For example, the dual encrypted data file 144 can be automatically deleted after two years of storage unless otherwise requested.

While the dual encrypted data file 144 is stored in the data logs 136, the transport facilitation system 100 may receive a request 183 from an authorized requesting entity 185 for the recorded content 126 of a particular trip arranged by the transport facilitation system 100. In some examples, the request 183 can include simply identifying information of the driver 109 (e.g., a name and operation region) and the requesting rider 199, and/or can indicate a time in which the trip occurred. Based on the request 183, the transport facilitation system 100 can perform lookup in the data logs 136 to find the dual encrypted data file 144 corresponding to the trip (325). In some examples, the request 183 can comprise a rider 199 or driver 109 request based on an incident that occurred during the trip (327). In other examples, the request 183 can comprise a legal request or subpoena from a legal authority, such as a court order corresponding to a dispute between the rider 199 and the driver 109 (329).

In response to the request 183, the transport facilitation system 100 can transmit private key requests, or decryption requests 167, to decrypt the dual encrypted data file 144 (330). In many examples, the private keys can comprise the rider and driver private keys 196, 114, and can be stored on the rider and driver devices 190, 110 respectively. Thus, the decryption request 167 can be transmitted to the user device 190 via the rider application 195 (332), and the driver device 110 via the driver application 111 (334). The transport facilitation system 100 may then receive an indication of whether the decryption requests 167 were accepted by the rider 199 and/or the driver 109 (335). If the decryption request 167 was declined by the rider 199 and/or driver 109 (337), the transport facilitation system 100 can transmit a notification 169 of non-compliance to the relevant parties seeking the decrypted content 166 (340). As described herein, the party seeking the decrypted content may be one of the driver 109 or rider 199 of the trip, and thus only a request 167 to the other party may be needed. Thus, non-compliance with the request 167 by that party may trigger additional third-party proceedings external to the scope of this disclosure. In some examples, the notification 169 can be transmitted to the rider 199 and/or driver 109 seeking the content (342), or may be transmitted to the authorized entity 185 (e.g., a legal authority) (344).

However, if the requests 167 is granted (339), then the transport facilitation system 100 can decrypt the dual encrypted content 144 and transmit the decrypted content 166, corresponding to the recorded content 126 of the trip, to the pertinent entity (345). In certain implementations, this step can comprise transmitting the dual encrypted content 144 to a first device for initial decryption (350). For example, the transport facilitation system 100 can first transmit the dual encrypted content 144 to the rider device 190 for an initial stage decryption using the rider private key 196, which still yields decrypted content requiring a second stage of decryption. The transport facilitation system 100 may then transmit the encrypted content (e.g., after first stage decryption) to the second device (e.g., the driver device 110) for the second decryption stage (e.g., utilizing the driver private key 114) (355). Thus, the transport facilitation system 100 an provide the content to the devices 190, 110 themselves for decryption on-device without receiving the private keys 196, 114. After receiving the decrypted content 166, the transport facilitation system 100 can transmit the content 166 to the authorized entity 185 (360).

In variations, the transport facilitation system 100 can retrieve the private keys 196, 114 from the rider device 190 and the driver device 110 (365), dually decrypt the content 144 using the private keys 196, 114, and transmit the decrypted content 166 to the authorized entity 185 (370). In such examples, the transport facilitation system 100 may then destroy the private keys 114, 196 for the rider 199 and driver 109 (375), and issue new public/private key pairs to the rider 199 and the driver 109 (380). According to some examples, the original public keys for the rider 199 and driver 109 may be maintained in the database 130 of the transport facilitation system 100. Furthermore, the original private keys 196, 114 may also be maintained on the respective rider device 190 and driver device 110 in case future requests 183 are required to dual encrypted content 144 associated with either the rider 199 or the driver 109. Yet, it is contemplated that any subsequent trip made by either the rider 199 or the driver 109 can be dually encrypted using the newly issued public keys to provide an additional layer of privacy.

It is further contemplated that the private keys 196, 114 may be stored on a trusted third-party key storage service (e.g., a cloud storage service), in which case appropriate authorization may be required to access the private keys 196, 114. In such implementations, the decryption request 167 may be transmitted to the third-party service entity only when authorization requirements have been met (e.g., a court order from an authorized court) in order to provide a privacy standard of operation.

Figure 4:
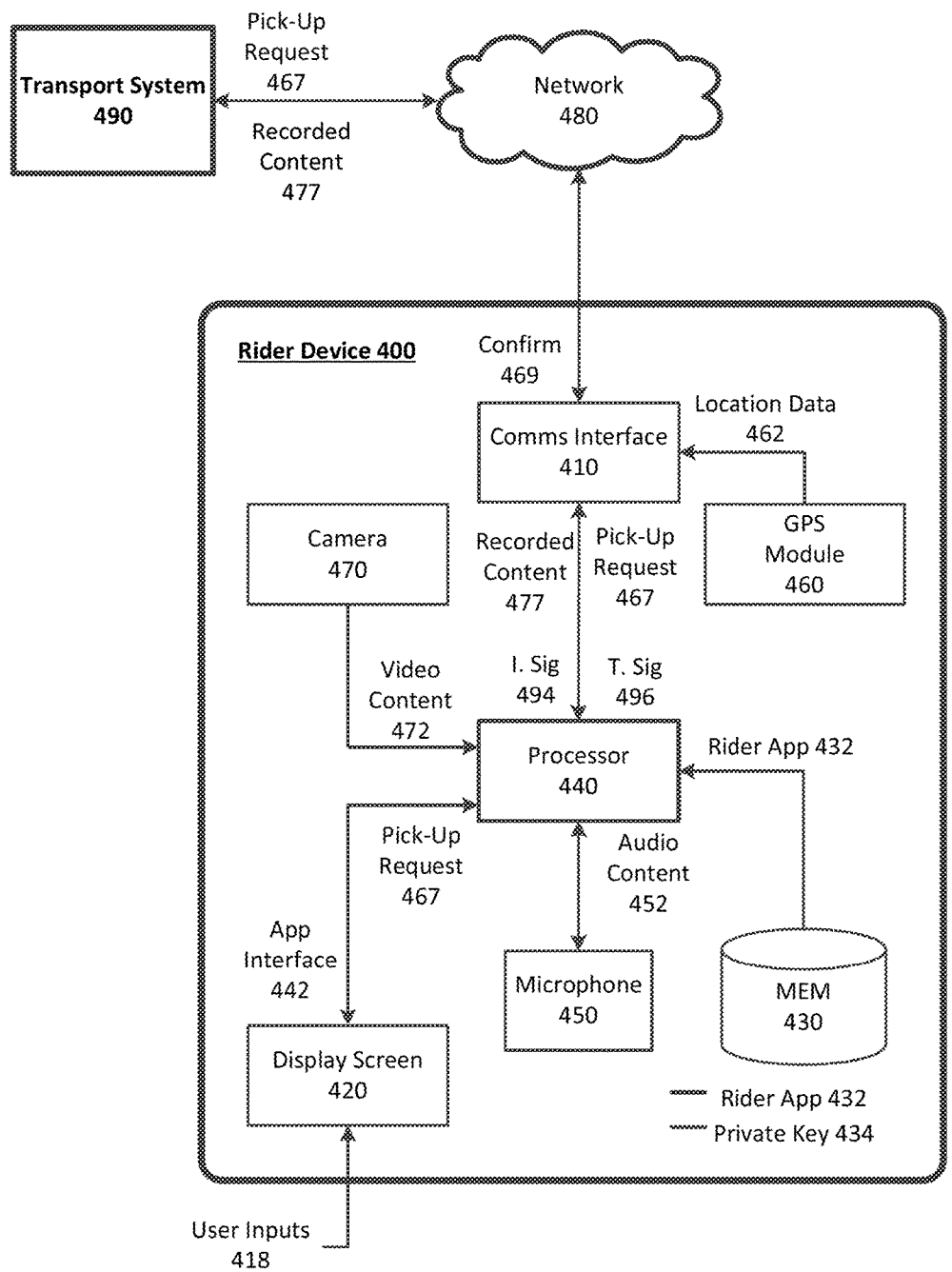
FIG. 4 is a block diagram illustrating an example rider device executing a designated rider application for a transport arrangement service, as described herein.

FIG. 4 is a block diagram illustrating an example rider device executing a designated rider application for a transport arrangement service, as described herein. In many implementations, the rider device 400 can comprise a mobile computing device, such as a smartphone, tablet computer, laptop computer, VR or AR headset device, and the like. The rider device 400 can store a designated application (e.g., a rider app 432) in a local memory 430. In response to a user input 418, the rider app 432 can be executed by a processor 440, which can cause an app interface 442 to be generated on a display screen 420 of the rider device 300. The app interface 442 can enable the user to, for example, check current price levels and availability for the transportation arrangement service. In various implementations, the app interface 442 can further enable the user to select from multiple ride services, such as a carpooling service, a regular rider service, a professional rider service, a van transport service, a luxurious ride service, and the like. Example services that may be browsed and requested can be those services provided by UBER Technologies, Inc. of San Francisco, Calif.

The user can generate a pick-up request 467 via user inputs 418 provided on the app interface 442. For example, the user can select a pick-up location, view the various service types and estimated pricing, and select a particular service for transportation to an inputted destination. In many examples, the user can input the destination prior to pick-up. The processor 440 can transmit the pick-up request 467 via a communications interface 410 to the backend transport facilitation system 490 over a network 480. In response, the rider device 400 can receive a confirmation 469 from the transport facilitation system 490 indicating the selected driver and vehicle that will service the pick-up request 467 and rendezvous with the user at the pick-up location.

In various examples, the rider device 400 can further include a GPS module 460, which can provide location data 462 indicating the current location of the requesting user to the transport system 490 to, for example, select an optimal driver or autonomous vehicle to service the pick-up request 467. In further implementations, the rider device 400 can include recording resources such as a camera 470 and a microphone 450. As provided herein, the transport facilitation system 490 can transmit initiation or initialization triggers 494 to the rider device 400, which can cause the processor 440 to initiate one or more of the camera 470 or microphone 450 to begin recording content over the course of a ride from a pick-up location to a destination. Thus, in certain examples, the camera 470 can provide video content 472 to the processor 440 and the microphone 450 can provide audio content 452 to the processor 440. The recorded content 477 (e.g., comprising audio content 452 and/or video content 472) may then be transmitted to the transport system 490 for dual encryption and storage. Furthermore, once the trip is completed and the rider dropped off at the destination, the rider device 400 can receive a termination trigger 596 that can cause the processor 440 to terminate content recording by the camera 470 and/or microphone 450.

In certain implementations, the rider device 400 may also store the private decryption key 434 in a secret file inaccessible to the transport system 490, and can utilize the private key 434 to facilitate decryption of the recorded content at a subsequent time.

Figure 5:
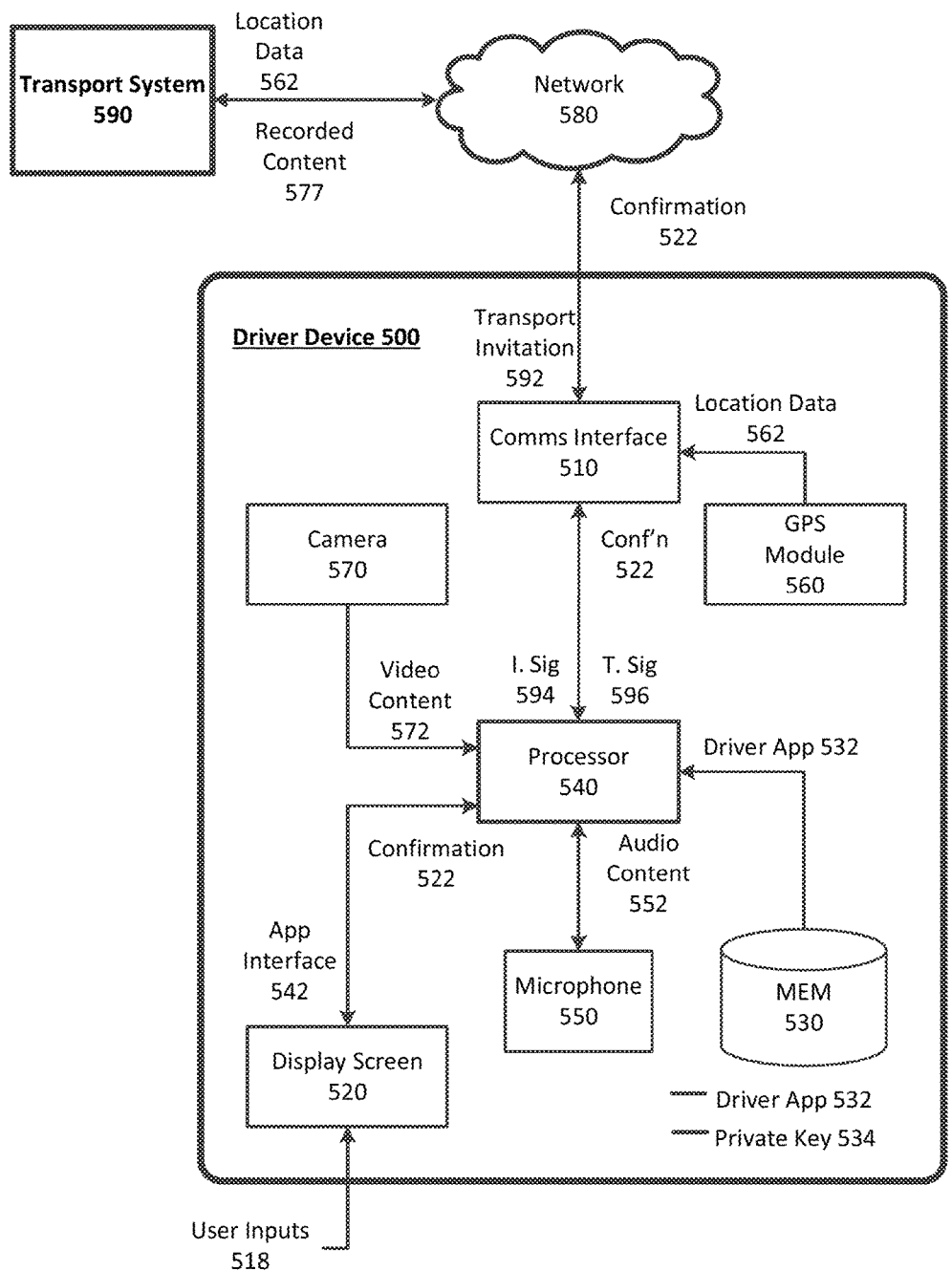
FIG. 5 is a block diagram illustrating an example driver device executing a designated driver application for a transport arrangement service, as described herein.

FIG. 5 is a block diagram illustrating an example driver device executing a designated driver application for a transport arrangement service, as described herein. In many implementations, the driver device 500 can comprise a mobile computing device, such as a smartphone, tablet computer, laptop computer, VR or AR headset device, and the like. The drive device 500 can store a designated application (e.g., a driver app 532) in a local memory 530. In response to a user input 518, the driver app 532 can be executed by a processor 540, which can cause an app interface 542 to be generated on a display screen 520 of the driver device 500. The app interface 542 can enable the driver to, for example, accept transport invitations 592 in order to service pick-up requests throughout a given region.

In various examples, the driver device 500 can include a GPS module 560, which can provide location data 562 indicating the current location of the driver to the transport system 590. Thus, the transport system 590 can utilize the location current location driver to determine whether the driver is optimally located to service a particular pick-up request. If so, the transport system 590 can transmit a transport invitation 592 to the driver device 500 over a network 580. The transport invitation 592 can be displayed on the app interface 542, and can be accepted or declined by the driver. If the driver accepts the invitation 592, then the driver can provide a user input 518 on the displayed app interface 542 to provide a confirmation 522 to the transport system 590 indicating that the driver will rendezvous with the requesting user at the pick-up location.

In further implementations, the driver device 500 can include recording resources such as a camera 570 and a microphone 550. As provided herein, the transport facilitation system 590 can transmit initiation or initialization triggers 594 to the driver device 500, which can cause the processor 540 to initiate one or more of the camera 570 or microphone 550 to begin recording content over the course of a ride from a pick-up location to a destination. Thus, in certain examples, the camera 570 can provide video content 572 to the processor 540 and the microphone 550 can provide audio content 552 to the processor 540. The recorded content 577 (e.g., comprising audio content 552 and/or video content 572) may then be transmitted to the transport system 590 for dual encryption and storage. Furthermore, once the trip is completed and the rider dropped off at the destination, the driver device 500 can receive a termination trigger 596 that can cause the processor 540 to terminate content recording by the camera 570 and/or microphone 550 until another transportation invitation 592 is accepted.

As described herein, the driver device 500 may also store the private decryption key 534 in a secret file inaccessible to the transport system 590, and can utilize the private key 534 to facilitate decryption of the recorded content at a subsequent time.

Hardware Diagram

Figure 6:
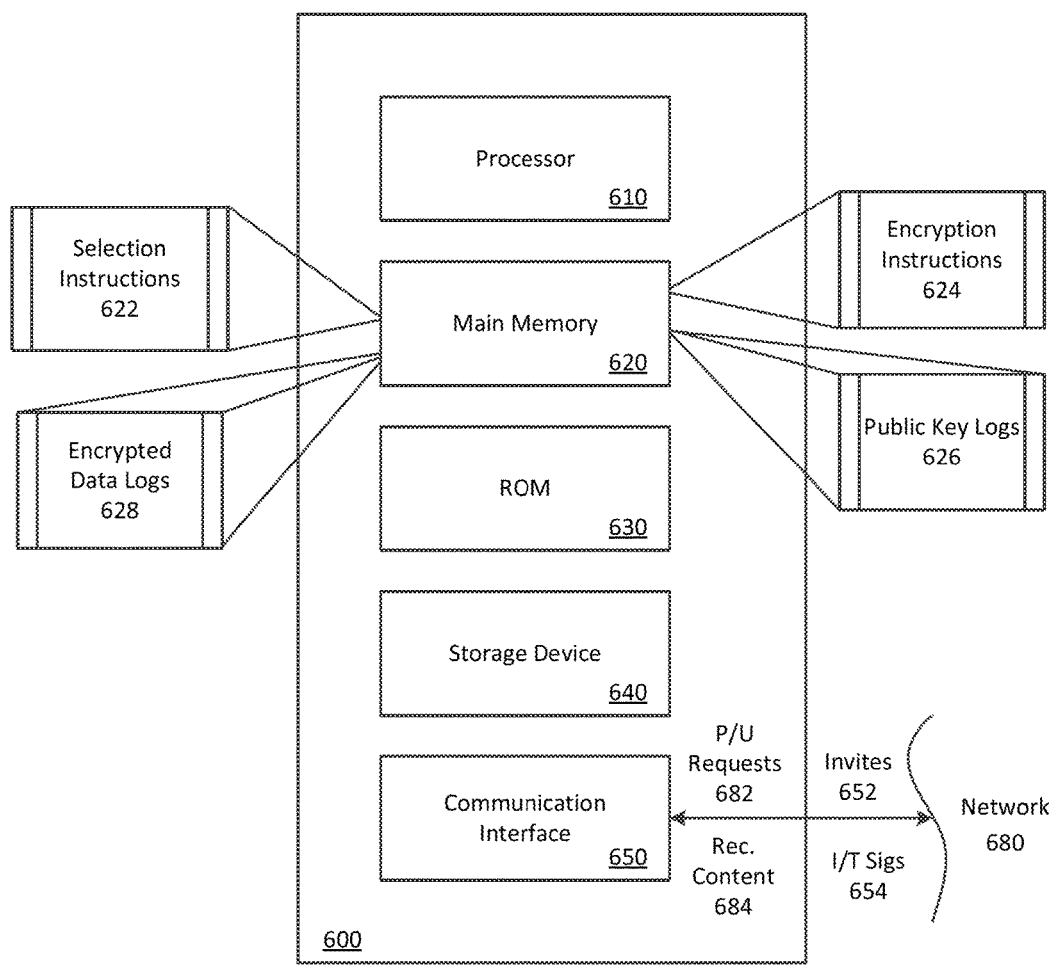
FIG. 6 is a block diagram illustrating a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing transportation services. In the context of FIG. 1, the transport facilitation system 100 may be implemented using a computer system 600 such as described by FIG. 6. The transport facilitation system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more AVs. In accordance with examples, the computer system 600 receives pick-up requests 684 from mobile computing devices of individual users. The executable instructions stored in the memory 630 can include selection instructions 622, which the processor 610 executes to select drivers to service pick-up requests based on pick-up locations and current locations of the drivers. The executable instructions stored in the memory 620 can also include encryption instructions 624, which enable the computer system 600 to receive recorded content 684 corresponding to serviced rides and dually encrypt the content using public keys of the driver and rider stored in public key logs 626.

By way of example, the instructions and data stored in the memory 620 can be executed by the processor 610 to implement an example transport facilitation system 100 of FIG. 1. In performing the operations, the processor 610 can receive pick-up requests 684, generate and transmit invitations 652 to service the pick-up requests 684, and transmit initialization and termination signals 654 to the driver and or rider devices to record content corresponding to the serviced rides. The recorded content 684 can be received and dually encrypted by the processor 610 and stored in encryption data logs 628.

The processor 610 is configured with software and/or other logic to perform one or more processes, steps and other functions described with implementations, such as described by FIGS. 1-3, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
one or more processors; and
one or more memory resources storing instructions that, when executed by the one or more processors, cause the one or more processors to:
  initiate one or more recording mechanisms within a vehicle to record content within a passenger interior of the vehicle as a driver transports a rider;
  after the vehicle arrives at a drop-off location, transmit one or more termination triggers to terminate the one or more recording mechanisms;
  dual encrypt the content utilizing a first public key associated with the driver and a second public key associated with the rider; and
  store the encrypted content in a storage device, wherein decryption of the encrypted content requires both a first private key associated with the driver and a second private key associated with the rider.

2. The computing system of claim 1, wherein the one or more recording mechanisms comprise a computing device of the driver, and wherein the executed instructions cause the one or more processors to initiate the one or more recording mechanisms by transmitting a first initiation signal to the computing device of the driver prior to the driver arriving at a rendezvous location with the rider.

3. The computing system of claim 2, wherein the executed instructions cause the one or more processors to initiate content recording on the computing device of the driver for each respective transport request serviced by the driver, and wherein the executed instructions cause the one or more processors to dual encrypt each respective recording using the first public key and a respective public key of a current rider associated with a current respective pick-up request.

4. The computing system of claim 2, wherein the one or more recording mechanisms further comprise a computing device of the rider, and wherein the executed instructions cause the one or more processors to initiate the one or more recording mechanisms by transmitting a second initiation signal to the computing device of the rider prior to the driver arriving at the rendezvous location.

5. The computing system of claim 4, wherein the executed instructions further cause the one or more processors to:
  while the driver is traveling to the rendezvous location, determine an estimated time of arrival (ETA) of the driver to the rendezvous location;
  wherein the executed instructions cause the one or more processors to transmit both the first and second initiation signals to the computing device of the driver and the computing device of the rider at a predetermined time prior to the driver arriving at the rendezvous location as determined from the ETA.

6. The computing system of claim 4, wherein the encrypted content comprises both content recorded by the computing device of the driver and content recorded by the computing device of the rider.

7. The computing system of claim 6, wherein the executed instructions cause the one or more processors to dual encrypt both the content recorded by the computing device of the driver and the content recorded by the computing device of the rider using both the first and second public keys.

8. The computing system of claim 4, wherein the first private key is stored on the computing device of the driver, and the second private key is stored on the computing device of the rider.

9. The computing system of claim 1, wherein the first and second private keys comprise dedicated private keys associated with encrypted content storage corresponding to a transportation service, and wherein the dedicated private keys are stored on a secure cloud encryption key storage site independent from the transportation service.

10. A non-transitory computer readable medium storing instructions that, when executed by one or more processors, cause the one or more processors to:
  initiate one or more recording mechanisms within a vehicle to record content within a passenger interior of the vehicle as a driver transports a rider;
  after the vehicle arrives at a drop-off location, transmit one or more termination triggers to terminate the one or more recording mechanisms;
  dual encrypt the content utilizing a first public key associated with the driver and a second public key associated with the rider; and
  store the encrypted content in a storage device, wherein decryption of the encrypted content requires both a first private key associated with the driver and a second private key associated with the rider.

11. The non-transitory computer readable medium of claim 10, wherein the one or more recording mechanisms comprise a computing device of the driver, and wherein the executed instructions cause the one or more processors to initiate the one or more recording mechanisms by transmitting a first initiation signal to the computing device of the driver prior to the driver arriving at a rendezvous location with the rider.

12. The non-transitory computer readable medium of claim 11, wherein the executed instructions cause the one or more processors to initiate content recording on the computing device of the driver for each respective transport request serviced by the driver, and wherein the executed instructions cause the one or more processors to dual encrypt each respective recording using the first public key and a respective public key of a current rider associated with a current respective pick-up request.

13. The non-transitory computer readable medium of claim 11, wherein the one or more recording mechanisms further comprise a computing device of the rider, and wherein the executed instructions cause the one or more processors to initiate the one or more recording mechanisms by transmitting a second initiation signal to the computing device of the rider prior to the driver arriving at the rendezvous location.

14. The non-transitory computer readable medium of claim 13, wherein the executed instructions further cause the one or more processors to:
  while the driver is traveling to the rendezvous location, determine an estimated time of arrival (ETA) of the driver to the rendezvous location;
  wherein the executed instructions cause the one or more processors to transmit both the first and second initiation signals to the computing device of the driver and the computing device of the rider at a predetermined time prior to the driver arriving at the rendezvous location as determined from the ETA.

15. The non-transitory computer readable medium of claim 13, wherein the encrypted content comprises both content recorded by the computing device of the driver and content recorded by the computing device of the rider.

16. The non-transitory computer readable medium of claim 15, wherein the executed instructions cause the one or more processors to dual encrypt both the content recorded by the computing device of the driver and the content recorded by the computing device of the rider using both the first and second public keys.

17. The non-transitory computer readable medium of claim 13, wherein the first private key is stored on the computing device of the driver, and the second private key is stored on the computing device of the rider.

18. The non-transitory computer readable medium of claim 10, wherein the first and second private keys comprise dedicated private keys associated with encrypted content storage corresponding to a transportation service, and wherein the dedicated private keys are stored on a secure cloud encryption key storage site independent from the transportation service.

19. A computer-implemented method of encrypting recorded content, the method being performed by one or more processors and comprising:
   initiating one or more recording mechanisms within a vehicle to record content within a passenger interior of the vehicle as a driver transports a rider;
   after the vehicle arrives at a drop-off location, transmitting one or more termination triggers to terminate the one or more recording mechanisms;
   dual encrypting the content utilizing a first public key associated with the driver and a second public key associated with the rider; and
   storing the encrypted content in a storage device, wherein decryption of the encrypted content requires both a first private key associated with the driver and a second private key associated with the rider.

20. The method of claim 19, wherein the one or more recording mechanisms comprise a computing device of the driver, and wherein the one or more processors initiate the one or more recording mechanisms by transmitting a first initiation signal to the computing device of the driver prior to the driver arriving at a rendezvous location with the rider.

* * * * *